(12) United States Patent
Lauer et al.

(10) Patent No.: US 8,216,467 B2
(45) Date of Patent: Jul. 10, 2012

(54) FILTER ELEMENT

(75) Inventors: Viktor Lauer, Nalbach (DE); Michael Sakraschinsky, St. Ingbert (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 433 days.

(21) Appl. No.: 12/309,735

(22) PCT Filed: Jun. 16, 2007

(86) PCT No.: PCT/EP2007/005314
§ 371 (c)(1),
(2), (4) Date: Sep. 3, 2009

(87) PCT Pub. No.: WO2008/014846
PCT Pub. Date: Feb. 7, 2008

(65) Prior Publication Data
US 2010/0012571 A1    Jan. 21, 2010

(30) Foreign Application Priority Data
Aug. 3, 2006    (DE) .......................... 10 2006 036 231

(51) Int. Cl.
*B01D 29/90*    (2006.01)
*B01D 35/147*    (2006.01)
*B01D 29/00*    (2006.01)

(52) U.S. Cl. ........ 210/240; 210/424; 210/423; 210/390; 210/418

(58) Field of Classification Search .......................... None
See application file for complete search history.

(56) References Cited

U.S. PATENT DOCUMENTS

| 4,133,763 | A | 1/1979 | Cooper |
| 4,439,984 | A | 4/1984 | Martin |
| 5,118,418 | A | 6/1992 | Roussel |
| 7,032,760 | B2 * | 4/2006 | Walton et al. ................. 210/425 |

FOREIGN PATENT DOCUMENTS

| DE | 1 948 958 A1 | 6/1971 |
| WO | WO 02/062447 A1 | 8/2002 |
| WO | WO 03/076041 A1 | 9/2003 |
| WO | WO 2005/061072 A1 | 7/2005 |

OTHER PUBLICATIONS

Notice of Reasons for Rejection (Translation), Japanese Patent Office, 4 pages, drafted Jun. 14, 2011, mailed Jun. 21, 2011.

* cited by examiner

*Primary Examiner* — Nam Nguyen
*Assistant Examiner* — Madeline Gonzalez
(74) *Attorney, Agent, or Firm* — Roylance, Abrams, Berdo & Goodman L.L.P.

(57) ABSTRACT

A filter device has a filter housing (1), at least one filter element (13) received in the filter housing (1) and an inner fluid space (71) limited by a filter medium (17) through which the fluid to be cleaned can flow. The filter medium separates the inner fluid space (71) from an exterior fluid space (11) located in the filter housing (1). The filter housing (1) has a fluid inlet (7) and a fluid outlet for cleaned fluid. A fluid guide device (9) is connected downstream to the fluid inlet (7) and can be optionally retrofitted to form a flow path between the fluid inlet (7) and the exterior fluid space (11) or between the fluid inlet (7) and the inner fluid space (71) disposed in the filter element (13).

18 Claims, 6 Drawing Sheets

FILTER ELEMENT

FIELD OF THE INVENTION

The invention relates to a filter device having a filter housing, at least one filter element held in the filter housing and an inner fluid space bordered by a filter medium through which a fluid to be cleaned can flow. The filter medium separates the inner fluid space from an outer fluid space located in the filter housing. The filter housing has a fluid inlet and a fluid outlet for the cleaned fluid.

BACKGROUND OF THE INVENTION

Filter devices of this type are generally known in different embodiments and are used in the most varied fluid systems, especially in installations with hydraulic systems. As a result of the many possible applications of these filter devices they can be produced in very large numbers. Thus, a design that can be economically produced for these filter devices is sought.

SUMMARY OF THE INVENTION

An object of the invention is to provide a filter device design enabling matching to different possible operating modes to allow the same filter device to accommodate different applications.

This object is basically achieved according to the invention by a filter device allowing the possibility of retrofitting to enable operation of the same filter device, depending on the application-specific requirements, with a filter element through which fluid flows from the exterior to the interior in the filtration process or with a filter element through which fluid flows from the interior to the exterior.

This functionality enables more versatile applications. Depending on the pressure level, the volumetric flow and other operating parameters, the filtration process flow preferably takes place through the filter element from the exterior to the interior or from the interior to the exterior. With a standardized design, as a result of which the desired economical production is enabled, different requirements can thus be satisfied. Moreover, the cost for warehousing and logistics is reduced due to the standardized design.

The arrangement can be made such that on the fluid guide device there are two set-up sites. One set-up site is assigned to the outer fluid space. The second set-up site is assigned to the inner fluid space. The process of retrofitting is made simple and reliable by the very unique assignment.

In advantageous embodiments, each set-up site has at least one fluid passage channel and preferably several fluid passage channels. The channel or channels can be blocked optionally for retrofitting of the fluid guide device. The retrofitting process simply involves blocking the fluid passage channels of the first set-up site or the fluid passage channels of the second set-up site.

Advantageously, the filter housing defines a main axis, and the fluid passage channels of the first set-up site are located at a greater distance from the main axis than the fluid passage channels of the second set-up site. The mouths of the channels for the filtration process, taking place in the filter element from the exterior to the interior, are then located in the outer wall region of the filter housing so that the filter element is exposed to the flow directly on its exterior. The fluid passage channels of the second set-up site discharge in the region nearer the main axis and adjacent to the inner fluid space of the filter element.

The filter device according to the invention preferably has a circularly cylindrical filter element in which the filter medium adjoins a fluid-permeable support tube. The filter element can be held in the filter housing such that the support tube extends concentrically to the main axis. Filter elements of this design are widely used in the pertinent technology.

Preferably, the fluid guide device is mounted in the filter housing between an inlet part having the fluid inlet and bordering the housing cover. A filtration part forms the outer fluid space and is axially offset to the inlet part. Preferably, in the filtration part, an element receiver for the filter element is made such that the filter element is located directly adjacent to the fluid guide device with that end on which the inner fluid space is accessible.

In especially advantageous embodiments, the fluid guide device can have an adapter plate penetrated by the fluid passage channels and forming on the peripheral side a seal between the inlet part and filtration part of the filter housing. The adapter plate has a coaxial socket projecting into the filtration part and forming both the element receiver for the filter element as well as a flow path leading into the inner fluid space of the filter element. This arrangement results in an especially compact design with the adapter plate forming the element receiver of the filter element, and according to the selected equipment being the fluid guide device making available the desired flow paths.

Preferably, the fluid passage channels of the first set-up site are located on the adapter plate on a circular line concentric to the main axis, with a radius chosen such that the fluid passage channels form flow paths to the exterior of the filter element.

In this configuration, the fluid passage channels of the second set-up site can also be located on the adapter plate on a circular line which is concentric to the main axis. The radius for this circular line is chosen such that the fluid passage channels form flow paths into the interior of the socket piece used as the element receiver.

In especially advantageous embodiments, the fluid passage channels of the fluid guide device are made as a seat for the bypass valves pretensioned into the blocking position and optionally insertable therein. For outfitting or retrofitting by selective blocking of the fluid passage channels of the first or second set-up site by installing bypass valves at the same time, the filter device is protected against an excess pressure difference which may be present on the filter medium.

The process of outfitting or retrofitting is made especially simple and convenient when the bypass valves are formed by valve inserts insertable as a premounted functional unit, including a spring-loaded closing part and valve seat, into selected fluid passage channels.

Depending on the selected mode of operation, preferably there are different filter elements. When, according to the outfitting of the fluid guide device, the filtration process takes place such that flow takes place through the filter element from the exterior to the interior, preferably a filter element with a support tube borders the inner fluid space and is surrounded on the exterior by the filter medium. Conversely, when flow takes place through the filter element from the interior to the exterior, preferably a filter element with a support tube is nearest the outer fluid space and is provided on its interior with the filter medium.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
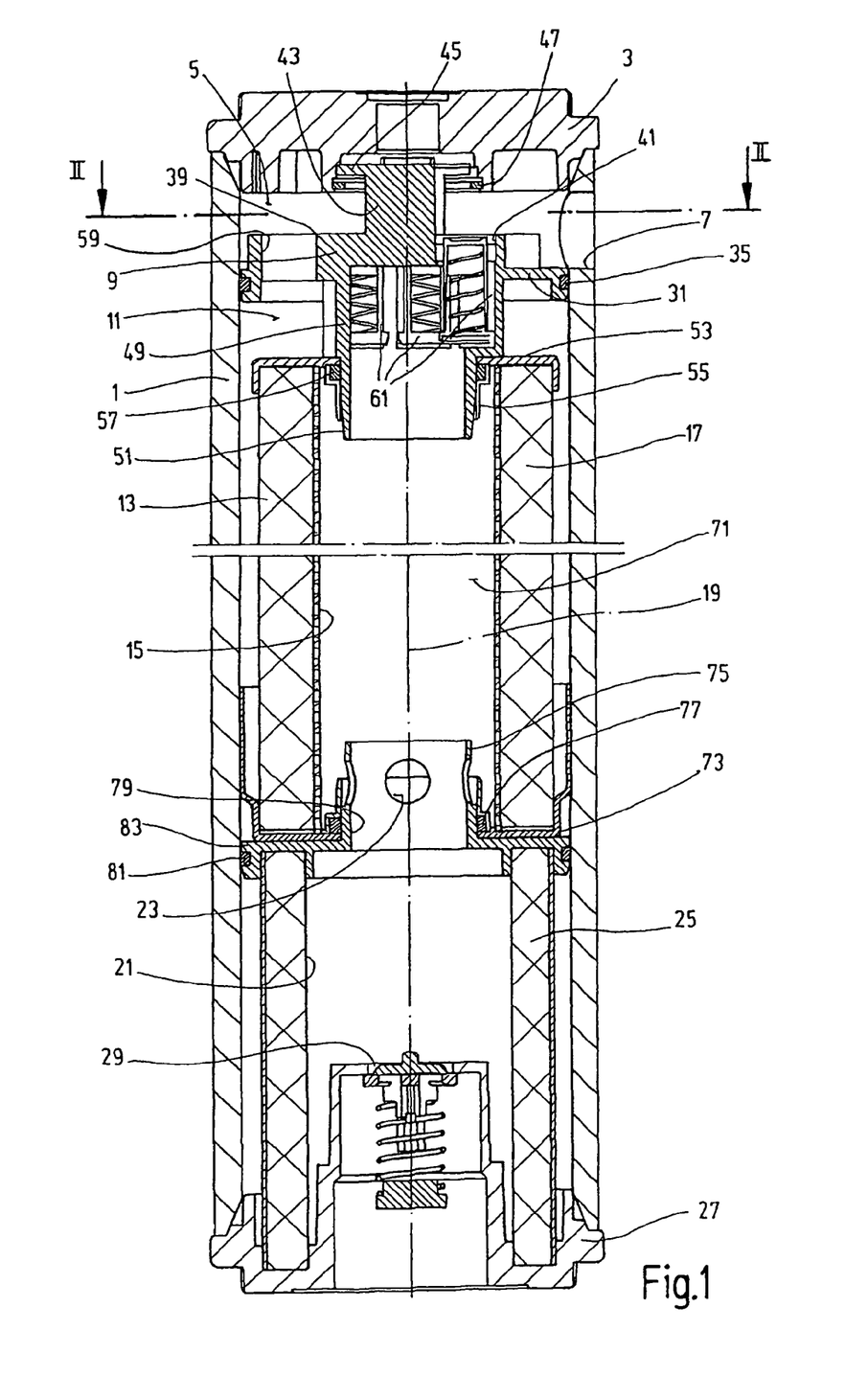
FIG. 1 is a shortened, slightly schematically simplified, side elevational view in section of a filter device according to an exemplary embodiment of the invention, in the operating state where flow takes place through the filter element from the exterior to the interior in the filtration process.

The filter device according to the invention has a filter housing 1 in the form of a circularly cylindrical metallic tube body produced by extrusion. On the end shown at the top in FIG. 1, the filter housing 1 is sealed by a housing cover 3 in the form of an aluminum diecasting. The interior of the cover 3 is connected to an inlet part 5 receiving the flow of the fluid to be cleaned through an inlet opening 7. The inlet part 5 is separated from the filtration part 11 in which a filter element 13 is housed by a fluid guide device formed by an adapter plate 9. A filter element 13 has generally conventional design with a fluid-permeable, circularly cylindrical support tube 15 and an adjoining filter medium 17 and likewise of a conventional type. The filter fineness is matched to the respective application. As FIG. 1 shows, the filter element 13 is held in the filter housing 1 such that the support tube 15 extends concentrically to the main axis 19 of the filter housing 1.

Within the filter housing 1, a protective screen 21 is connected downstream from the filter element 13. Fluid cleaned by the filter element 13 travels into the interior of the protective screen 21 by way of an inlet opening 23. After the fluid passes through screened medium 25 and the protective screen, the cleaned fluid leaves the filter housing 1 through a fluid outlet (not shown). The protective screen 21 is connected by cementing to the bottom cover 27 forming the housing termination. A pressure holding valve 29 pretensioned into the closed position is mounted on bottom cover 27.

Figure 3:
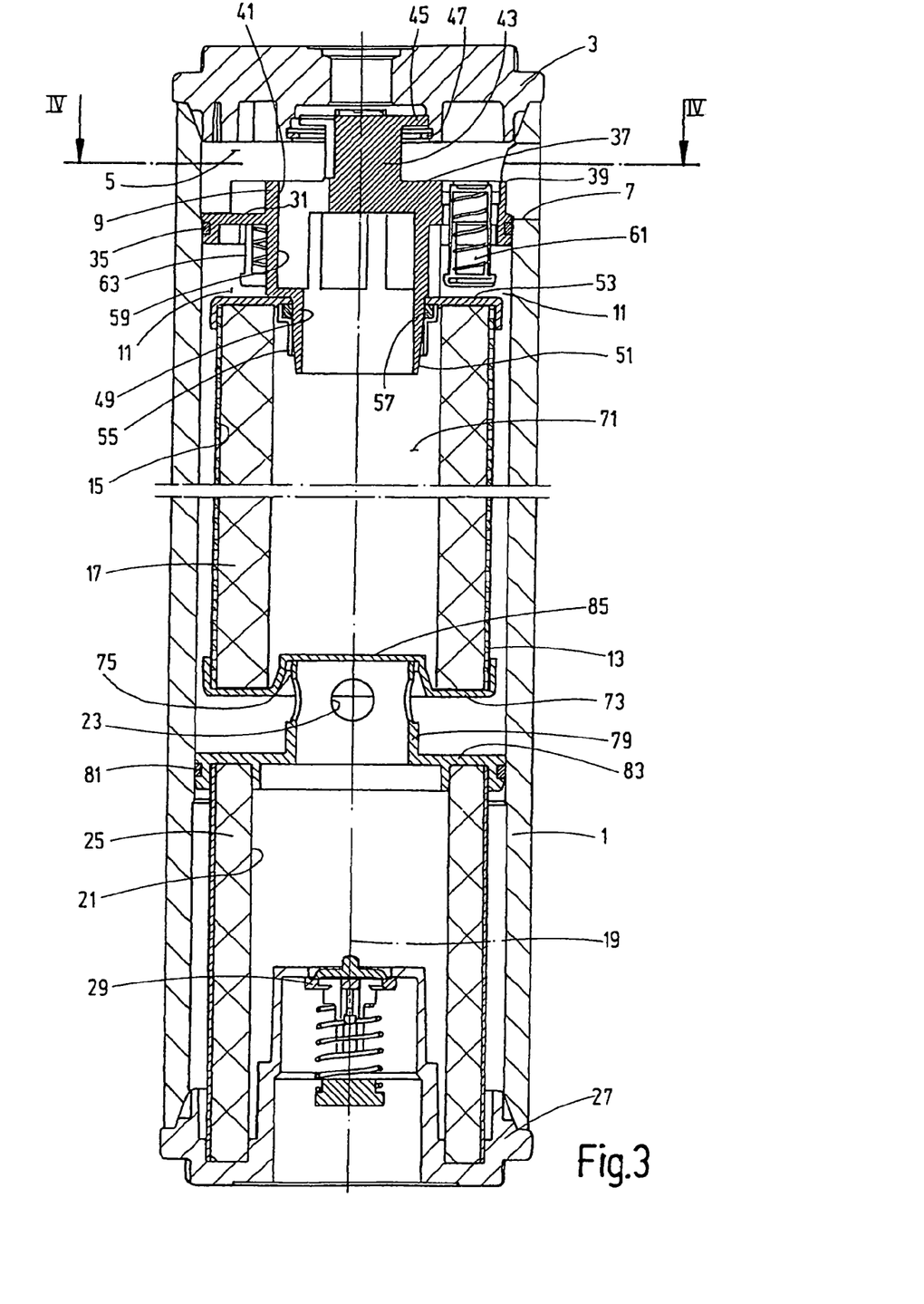
FIG. 3 is a side elevational view in section of the filter device of FIG. 1 in the operating state where flow takes place through the filter element from the interior to the exterior in the filtration process.
Figure 5:
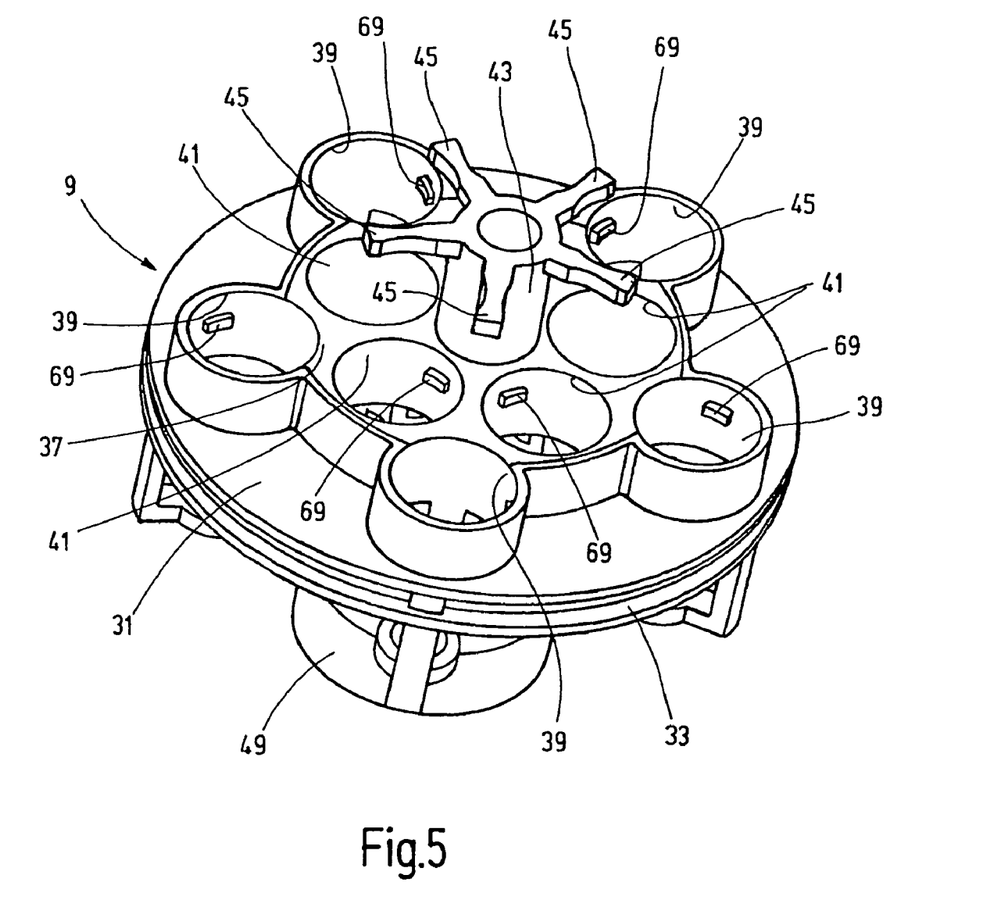
FIG. 5 is a perspective view of the fluid guide device of the embodiment forming an adapter plate, enlarged compared to FIGS. 1 to 4.
Figure 6:
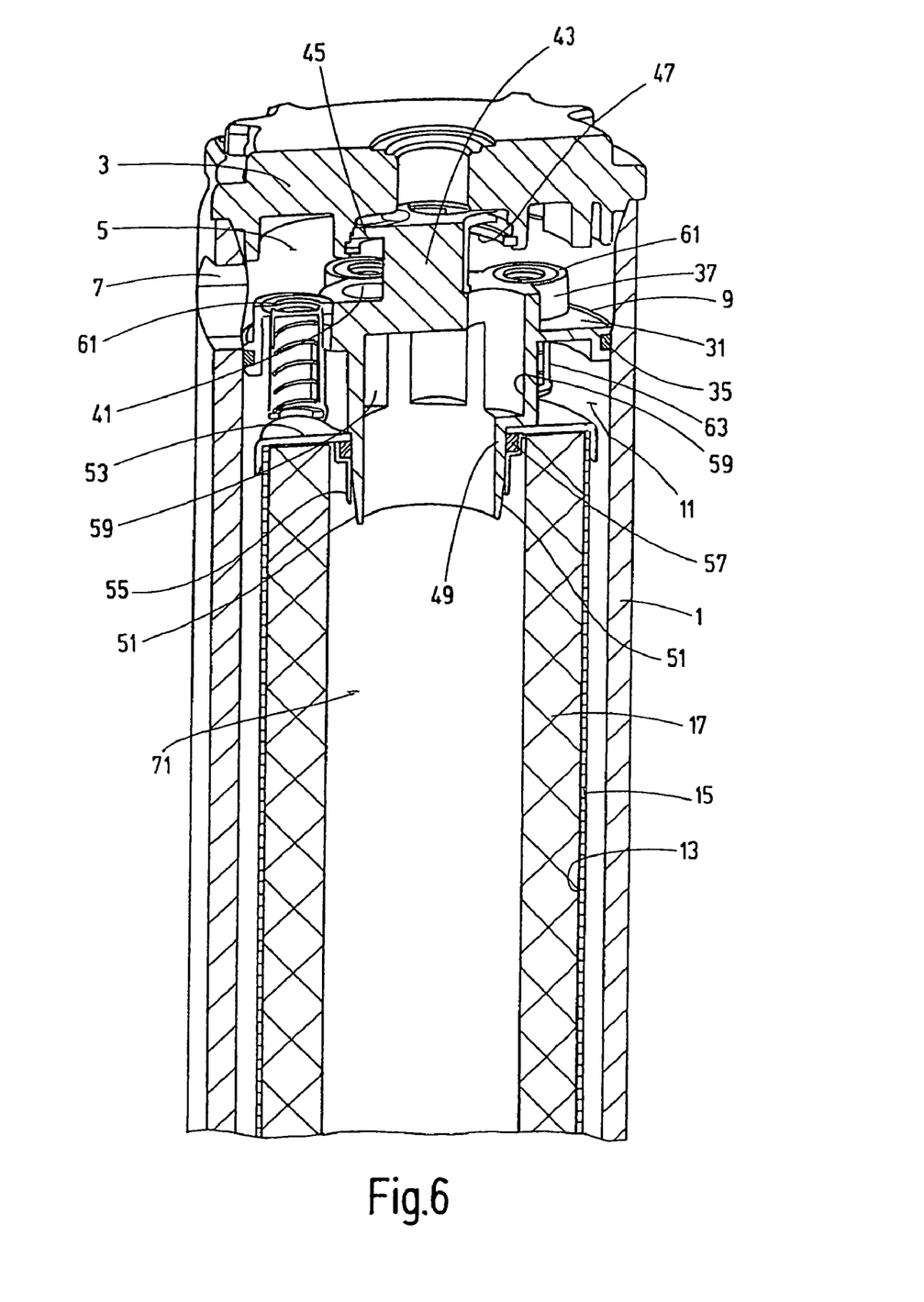
FIG. 6 is a partial perspective of the end section of the embodiment containing the fluid guide device.

Details of the adapter plate 9 used as a fluid guide device are shown especially clearly in FIG. 5. The adapter plate 9 has a round plate part 31 with an annular groove 33 located on the outer peripheral side to receive and hold an O-ring 35, see FIGS. 1, 3 and 6, for sealing the adapter plate 9 on the interior wall of the filter housing 1. The adapter plate 9 then forms a separating element between the inlet part 5 and the filtration part 11. A collar 37 projects axially from the plate part 31 to form fluid passage channels. Lying on an exterior circular line five outer openings 39 are provided. Lying on a circular annular line farther to the interior, five inner openings 41 are provided. In FIG. 5 only four of the inner openings 41 are visible. To attach the adapter plate 9 to the housing cover 3, a central peg 43 projects axially from the collar 37. On the axial end side of central peg 43 a star body with radially extending arms 45 (FIG. 5) is molded. As FIGS. 1, 3, and 6 show, the ends of the arms 45 are connected to the housing cover 3 by a snap ring 47 sitting in the annular groove of the housing cover.

On the side opposite the peg 43, the adapter plate 9 forms a flanged socket 49 projecting axially and coaxially to the main axis 19. The socket beveled exterior 51 forms an element receiver for the filter element 13. The filter element end cap 53 has an edge enclosure 55 which can be slipped onto the socket 49. An O-ring 57 forms a seal.

Figure 2:
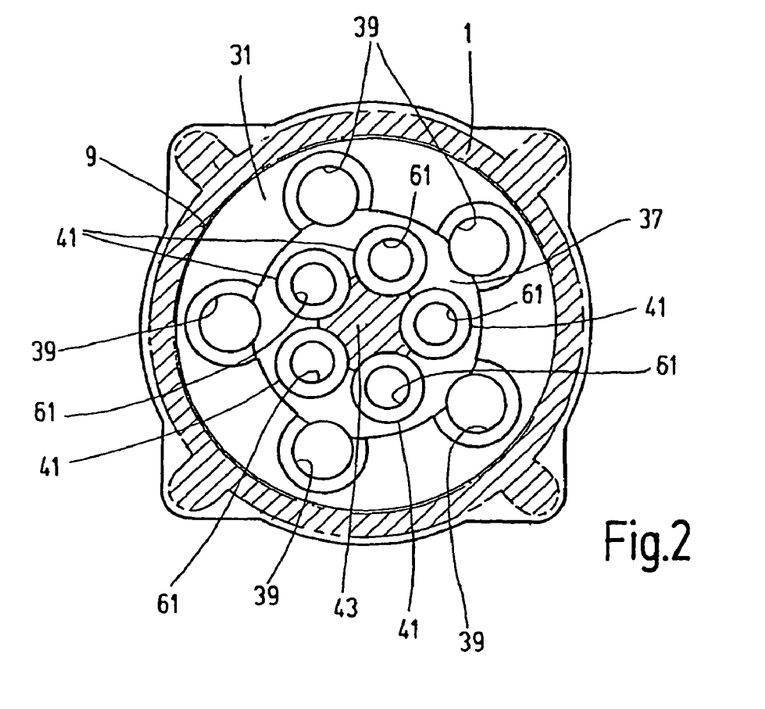
FIG. 2 is a top plan view in section of the embodiment taken along line II-II of FIG. 1.
Figure 7:
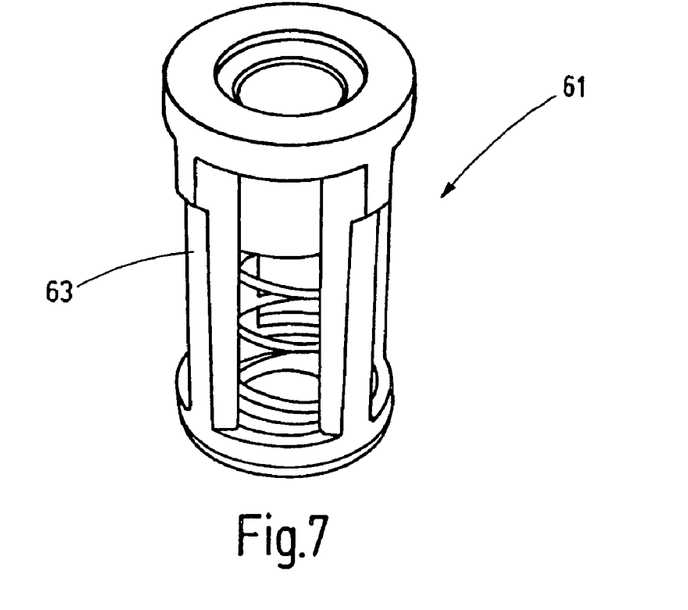
FIG. 7 is a perspective of a bypass valve insert of the embodiment of the filter device of FIG. 1, on a scale approximately twice that of a practical embodiment.
Figure 8:
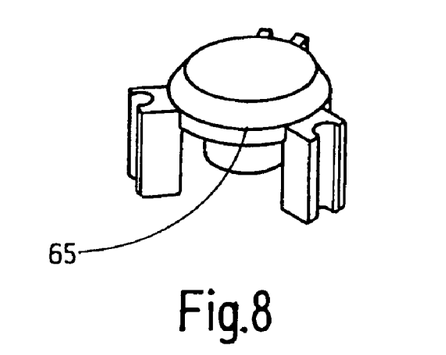
FIGS. 8 and 9 are individual perspectives of the movable closing part and of the valve seat, respectively, of the valve insert of FIG. 7.
Figure 9:
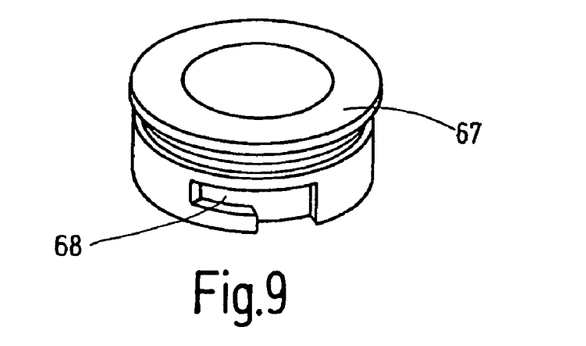

As mentioned, the adapter plate 9 used as the fluid guide device can be outfitted or retrofitted such that in the filtration process flow takes place through the filter element 13 either from the exterior to the interior or from the interior to the exterior. FIGS. 1 and 2 show the state in which flow takes place through the filter element 13 from the exterior to the interior. FIG. 5 shows the adapter plate 9 in a state which has not been outfitted, with none of the openings 39 and 41 being equipped with a blocking element. The adapter plate 9 in the operating state of FIGS. 1 and 2 is outfitted such that the openings 39 of the first or outer set-up site are cleared to form free fluid passage channels 59 (FIG. 1). These fluid passage channels 59, as can likewise be recognized from FIG. 1, form flow paths in the filtration part 11 leading to the exterior of the filter element 13. The openings 41 of the adapter plate 9 of the second or inner set-up site are blocked by valve inserts 61. One valve insert 61 is shown separately and enlarged in FIG. 7 and is a bypass valve with a spring-loaded closing body 65 movably guided in a cage 63. Body 65 interacts with a valve seat 67, see FIGS. 7 to 9. The exterior of the valve seat 67 has a quarter-turn fastener guide 68 permitting the valve insert 61 inserted into an opening 39 or 41 to be secured by engaging a safety projection 69 (FIG. 5). FIG. 2 clearly shows that the inner openings 41 of the adapter plate 9 are equipped with valve inserts 61, while the outer openings 39 are open.

In this operating mode a filter element 13 is used in which the support tube 15 is inside and borders the inner fluid space 71 of the filter element 13. The support tube 15 is surrounded on the outer peripheral side by the filter medium 17. In this instance, the filter element 13 has a bottom cover 73 with the central opening having an edge enclosure 75 corresponding to the edge enclosure 55. The input part 79 of the protective screen 21 extends into edge enclosure 75 with interposition of an O-ring 77. The cleaned fluid then travels into the protective screen 21 via the inlet opening 23 located thereon. The input part 79 of the protective screen 21 is located on a cover part 83 sealed relative to the filter housing 1 by an O-ring 81. Cover part 83 together with the edge enclosure 75 forms an element receiver between the filter element 13 and the protective screen 21.

Figure 4:
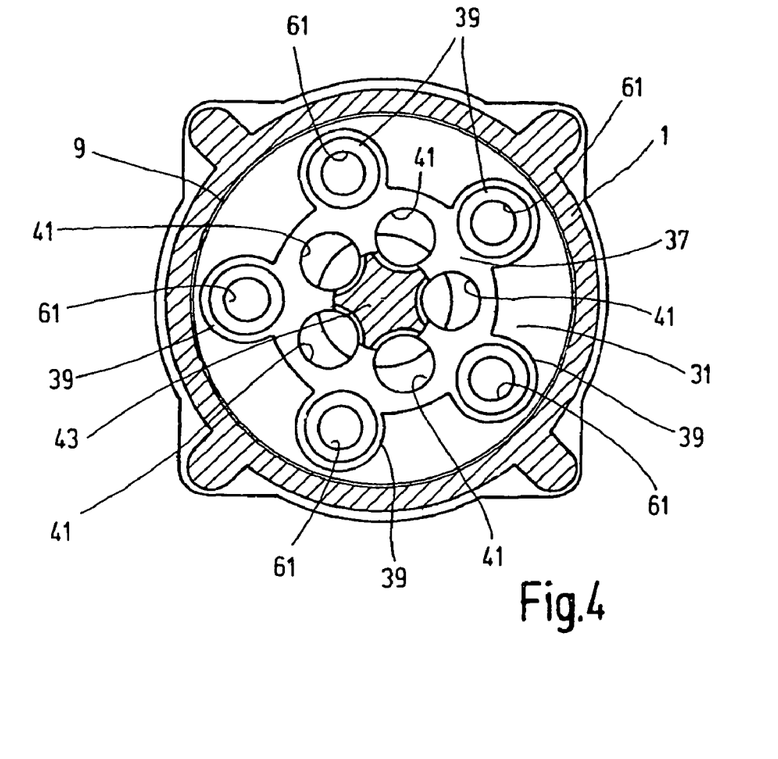
FIG. 4 is a top plan view in section of the embodiment taken along line IV-IV of FIG. 3.

FIGS. 3 and 4 show the operating state in which the adapter plate 9 is retrofitted such that the openings 39 of the outer set-up site are equipped with valve inserts 61, while the openings 41 of the inner set-up site are free to form fluid passage channels 59 leading into the interior of the socket 49 and thus into the inner fluid space 71 of the filter element 13. As FIGS. 3 and 6 likewise show, in this connection, a filter element 13 is used having the support tube 15 located on the exterior and the filter medium 17 provided on its interior. The fluid which has been cleaned as it passes from the interior to the exterior travels through the inlet opening 23 to the protective screen 21. As FIG. 3 clearly shows, in this instance the lower bottom cover 73 of the filter element 13 is continuous to close the inner fluid space 71. A depression 85 in the bottom cover 73 in interaction with the input part 79 of the protective screen 21 forms the lower centering of the filter element 13.

While one embodiment has been chosen to illustrate the invention, it will be understood by those skilled in the art that various changes and modifications can be made therein without departing from the scope of the invention as defined in the appended claims.

What is claimed is:

1. A filter device comprising:
a filter housing having a fluid inlet for fluid to be cleaned, a fluid outlet for cleaned fluid, a main axis, an inlet part and a filtration part;
at least one filter element held in said filter housing and having an inner fluid space bordered by and inside of a filter medium for fluid to flow therethrough to be cleaned, said filter medium separating said inner fluid space from an outer fluid space in said filter housing;
a retrofittable fluid guide device connected in said housing downstream from said fluid inlet optionally forming one of a first flow path between said fluid inlet and said outer fluid space and a second flow path between said fluid inlet and said inner fluid space, said fluid guide device having an adapter plate and first and second set-up sites for said outer and inner fluid spaces, respectively, said first and second set-up sites having first and second fluid passage channels, respectively, penetrating said adapter plate that can be optionally blocked and opened to retrofit said fluid guide device, said first fluid passage channels of said first set-up site being located at a greater distance from said main axis than said second fluid passage channels of said second set-up site and being located on a circular line concentric with said main axis and with a radius positioning said first fluid passage channels exteriorly of said filter element;
a seal on a peripheral side of said adapter plate between said inlet part and said filtration part inside said filter housing; and
a coaxial socket extending from said adapter plate into said filtration part receiving said filter element and forming a flow path into said inner fluid space.

2. A filter device according to claim 1 wherein
said filter element has a circular cylindrical shape, has a fluid permeable support tube adjoining said filter medium and is held in said filter housing concentrically to said main axis.

3. A filter device according to claim 2 wherein
said fluid guide device is located in said housing between said inlet part having said fluid inlet and bordering a housing cover coupled to said filter housing and said filtration part forming said outer fluid space and being axially offset relative to said inlet part.

4. A filter device according to claim 1 wherein
said second fluid passage channels of said second set-up site are located on said adapter plate on a circular line concentric to said main axis and with a radius positioning said second fluid passage channels to form flow paths into an interior of said socket.

5. A filter device according to claim 1 wherein
said fluid passage channels form seats for and can optionally receive bypass valves pretensioned into blocking positions.

6. A filter device according to claim 5 wherein
said bypass valves comprise valve inserts insertable as premounted functional units including spring-loaded closing parts and valve seats.

7. A filter device according to claim 1 wherein
said filter element comprises a support tube bordering said inner fluid space and surrounded on an exterior thereof by said filter medium when said fluid guide device has said first fluid passage channels open and said second fluid passage channels blocked.

8. A filter device according to claim 1 wherein
said filter element comprises a support tube bordering said outer fluid space and surrounded on an interior thereof by said filter medium when said fluid guide device has said second fluid passage channels open and said first fluid passage channels blocked.

9. A filter device comprising:
a filter housing having a fluid inlet for fluid to be cleaned, a fluid outlet for cleaned fluid and a main axis;
at least one filter element held in said filter housing and having an inner fluid space bordered by and inside of a filter medium for fluid to flow therethrough to be cleaned, said filter medium separating said inner fluid space from an outer fluid space in said filter housing; and
a retrofittable fluid guide device connected in said housing downstream from said fluid inlet optionally forming one of a first flow path between said fluid inlet and said outer fluid space and a second flow path between said fluid inlet and said inner fluid space, said fluid guide device having first and second set-up sites for said outer and inner fluid spaces, respectively, each of said set-up sites having at least one fluid passage channel that can be optionally blocked and opened to retrofit said fluid guide device, each said fluid passage channel forming a seat for and optionally receiving a bypass valve pretensioned into a blocking position.

10. A filter device according to claim 9 wherein
said fluid passage channel of said first set-up site is located at a greater distance from said main axis than said fluid passage channel of said second set-up site.

11. A filter device according to claim 10 wherein
said filter element has a circular cylindrical shape, has a fluid permeable support tube adjoining said filter medium and is held in said filter housing concentrically to said main axis.

12. A filter device according to claim 11 wherein
said filter housing has an inlet part having said fluid inlet, has a filtration part having said fluid outlet and has a housing cover bordering said inlet part, said filtration part forming said outer fluid space axially offset relative to said inlet part.

13. A filter device according to claim 12 wherein
said fluid guide device comprises an adapter plate being penetrated by said fluid passage channels, having a seal on a peripheral side thereof between said inlet part and said filtration part in said filter housing and having a coaxial socket projecting into said filtration part and receiving said filter element to form a flow path into said inner fluid space.

14. A filter device according to claim 13 wherein
said first set-up site comprises a plurality of fluid passage channels located on a circular line concentric to said main axis and with a radius positioning said fluid passage channels of said first set-up site exteriorly of said filter element.

15. A filter device according to claim 14 wherein
said second set-up site comprises a plurality of fluid passage channels located on a circular line concentric to said main axis and with a radius positioning said fluid passage channels of said second set-up site extending into an interior of said socket.

16. A filter device according to claim 14 wherein
said bypass valve comprises a valve insert insertable as a premounted functional unit including a spring-loaded closing part and a valve seat.

17. A filter device according to claim 9 wherein
said filter element comprises a support tube bordering said inner fluid space and surrounded on an exterior thereof by said filter medium when said fluid guide device has said fluid passage channel of said first set-up site open and said fluid passage channel of said second set-up site blocked.

18. A filter device according to claim 9 wherein
said filter element comprises a support tube bordering said outer fluid space and surrounded on an interior thereof by said filter medium when said fluid guide device has said fluid passage channel of said second set-up site open and said fluid passage channel of said first set-up site blocked.

* * * * *